United States Patent [19]

Brown et al.

[11] Patent Number: 4,994,525
[45] Date of Patent: Feb. 19, 1991

[54] FUNCTIONALIZED POLYPHENYLENE ETHERS, METHOD OF PREPARATION, AND POLYPHENYLENE ETHER-POLYAMIDE COMPOSITIONS PREPARED THEREFROM

[75] Inventors: Sterling B. Brown; Schenectady, N.Y.

[73] Assignee: General Electric Company, Schenectady, N.Y.

[21] Appl. No.: 912,705

[22] Filed: Sep. 29, 1986

Related U.S. Application Data

[63] Continuation-in-part of Ser. No. 866,661, May 27, 1986, abandoned.

[51] Int. Cl.$^5$ ............... C08L 71/04; C08L 77/06
[52] U.S. Cl. ...................... 525/66; 525/68; 525/92; 525/133; 525/391; 525/396; 525/397; 525/423; 525/430
[58] Field of Search ............... 525/390, 391, 392, 395, 525/396, 397, 423, 430, 534, 905, 66, 92, 133

[56] References Cited

U.S. PATENT DOCUMENTS

| | | |
|---|---|---|
| 3,417,053 | 12/1968 | Chalk . |
| 4,315,086 | 2/1982 | Ueno .................. 525/391 |
| 4,614,773 | 9/1986 | Sugio .................. 525/391 |

FOREIGN PATENT DOCUMENTS 52-30991  8/1977  Japan .
59-66452  4/1984  Japan .

Primary Examiner—Patricia Short
Attorney, Agent, or Firm—William H. Pittman; James C. Davis, Jr.

[57] ABSTRACT

Functionalized polyphenylene ethers are prepared by reacting a polyphenylene ether with a polymerizable olefinic compound containing a phosphorus or silicon atom or an epoxy or lactam group, preferably in the presence of a free radical initiator. They may be used in the preparation of compatible polyphenylene ether blends with such polymers as polyesters and polyamides.

6 Claims, No Drawings

FUNCTIONALIZED POLYPHENYLENE ETHERS, METHOD OF PREPARATION, AND POLYPHENYLENE ETHER-POLYAMIDE COMPOSITIONS PREPARED THEREFROM

This application is a continuation-in-part of copending application Ser. No. 866,661, filed May 27, 1986, now abandoned.

This invention relates to functionalized polyphenylene ethers and their preparation and use.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are polyamides and linear polyesters, including poly(alkylene dicarboxylates). However, such blends frequently undergo phase separation and delamination. They typically contain large, incompletely dispersed polyphenylene ether particles and no phase interaction between the two resin phases. Molded parts made from such blends are typically characterized by extremely low impact strength.

The present invention includes functionalized polyphenylene ether compositions which are capable of compatibilizing blends of polyphenylene ethers with such polymers as polyamides and linear polyesters. It also includes novel polyphenylene ether-polyamide compositions with desirable properties.

In one of its aspects, the present invention is directed to a method for the preparation of a functionalized polyphenylene ether which comprises reacting a polyphenylene ether with at least one polymerizable olefinic compound of the formula $$R^2CH{=}C{-}Z, \quad (I)$$
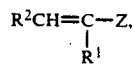

wherein $R^1$ is hydrogen or lower alkyl, $R^2$ is hydrogen or a substantially inert substituent and Z is a reactive group containing at least one phosphorus or silicon atom which is non-removable by hydrolysis or at least one epoxy or lactam group. Functionalized polyphenylene ethers so prepared are another aspect of the invention.

The polyphenylene ethers (also known as polyphenylene oxides) used in this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

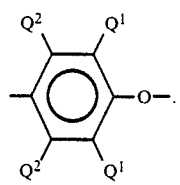

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy carbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purposes of this invention are those which comprise molecules having at least one of the end groups of the formulas

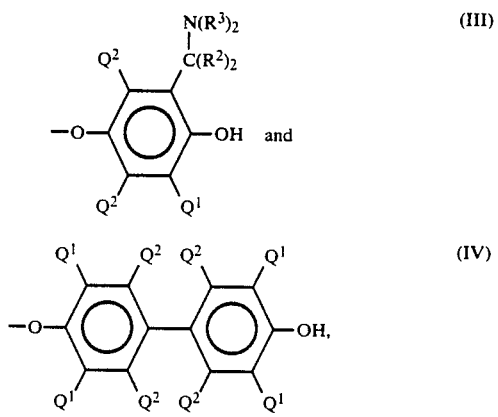

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

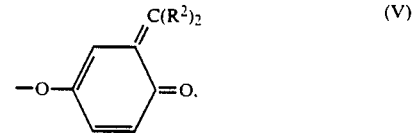

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

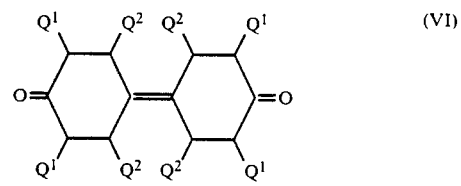

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

According to the present invention, the polyphenylene ether is reacted with at least one polymerizable olefinic compound of formula I. The $R^1$ value in that formula may be hydrogen or lower alkyl (i.e., alkyl of up to 7 carbon atoms) and is preferably hydrogen or methyl.

The $R^2$ value may be hydrogen or a substituent which is inert under the reaction conditions employed. Illustrative substituents alkyl, aryl, carbalkoxy and nitrile. Hydrogen is frequently preferred.

The Z value is a reactive group containing at least one phosphorus or silicon atom or epoxy or lactam group. At least one of any phosphorus or silicon atoms therein is not removable by hydrolysis. Thus, illustrative phosphorus-containing moieties are phosphonic acid, phosphinic acid, phosphonic acid ester and phosphinic acid ester moieties, with phosphonic acid and phosphonic acid ester moieties being preferred. Illustrative silicon-containing moieties are silyl and siloxane moieties, with trisalkoxysilyl being preferred. The epoxy-containing group is preferably a glycidyl group, and the lactam-containing group may be derived from any known- lactam; examples are pivalolactam, δ-valerolactam, ε-caprolactam and laurolactam. ε-Caprolactam is especially preferred.

The compounds of formula I may also contain various linking moieties linking the vinyl group to the phosphorus or silicon atom or epoxy or lactam group. Illustrative linking moieties are carboxy groups and oxygen atoms.

Thus, it will be apparent to those skilled in the art that suitable compounds of formula I include glycidyl methacrylate, glycidyl acrylate, glycidyl ethyl maleate, glycidyl ethyl fumarate, allyl glycidyl ether, N-vinylcaprolactam, vinyltrimethoxysilane, vinyltris(2-methoxyethoxy)silane, diethyl vinylphosphonate and di-(2-chloroethyl) vinylphosphonate. The glycidyl compounds are preferred.

The reaction between the polyphenylene ether and the olefinic compound is typically conducted at temperatures in the range of about 100°–350° C. The proportions of reagents are subject to wide variation, depending on the degree of functionalization desired; the weight ratio of olefinic compound to polyphenylene ether is typically in the range of about 0.1–1.5:1.

It is frequently advantageous to employ a free radical initiator in the reaction. Typical initiators are known in the art and include such compounds as benzoyl peroxide, dicumyl peroxide, di-t-butyl peroxide, t-butyl hydroperoxide and azobisisobutyronitrile. The proportion of free radical initiator is typically in the range of about 1–10% by weight, based on polyphenylene ether.

The reaction may be conducted in solution in a substantially inert diluent such as toluene, xylene, chlorobenzene, o-dichlorobenzene or 1,2,4-trichlorobenzene, followed by isolation of the functionalized polyphenylene ether by conventional operations such as precipitation by a non-solvent therefor. It is also possible to conduct the reaction in the melt. Melt reactions are often conveniently carried out in an extruder or similar equipment.

It is frequently found that some homopolymerization of the olefinic compound occurs simultaneously with functionalization of the polyphenylene ether. This is especially true with olefinic epoxides. Since the presence of homopolymer is not beneficial for the purposes of the invention, removal thereof is often advisable. It may be achieved by conventional means, typically involving precipitation of a methylene chloride complex of the polyphenylene ether as described by Factor et al. in *J. Polymer Sci., Polymer Letters Ed.*, 7, 205–209 (1969).

The precise chemical nature of the functionalization which takes place upon practice of the method of this invention is not known with certainty. The principal reaction may be a thermally initiated free radical interaction of the carbon-carbon double bond with the aromatic rings or the substituents thereon, especially the latter, to produce a product which may include single moieties and/or grafted side chains derived from vinyl compound.

It is known, however, that the functionalization is in the form of moieties having the formula

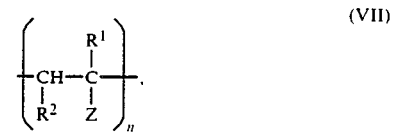

wherein $R^1$, $R^2$ and Z are as previously defined and n is at least 1, preferably from 1 to about 10. Compositions comprising functionalized polyphenylene ethers containing at least one moiety of formula VII are another aspect of the invention.

The preparation of the functionalized polyphenylene ethers of this invention is illustrated by the following examples. The polyphenylene ether used in each example herein was a poly-(2,6-dimethyl-1,4-phenylene ether) having a number average molecular weight of about 20,000, an intrinsic viscosity (IV) in chloroform at 25° C. of 0.48 dl./g.

EXAMPLES 1–9

Various olefinic compounds, in combination with dicumyl peroxide as a free radical initiator, were added to solutions of polyphenylene ether in chlorobenzene (Examples 1–3 and 5–9) or 1,2,4-trichlorobenezene (Example 4). The solutions were heated to reflux under nitrogen, with stirring, and the crude functionalized polymers were cooled and precipitated with methanol.

The products of Examples 1–7 and 9 were purified by dissolving at a level of about 5% by weight in methylene chloride, allowing the solution to stand until the methylene chloride complex had precipitated, filtering, washing with methylene chloride and drying in an oven. The product of Example 8 was dissolved in toluene, precipitated into methanol and oven dried.

The relevant parameters are given in Table I.

TABLE I

| | Monomer | | | Initiator amt., | |
|---|---|---|---|---|---|
| Example | Identity | Grams per g. PPE | Soln. PPE conc., % (w/v) | % (wt.) of PPE | Reaction time, hrs. |
| 1 | Glycidyl methacrylate | 0.58 | 9.6 | 4.3 | 3 |
| 2 | Glycidyl acrylate | 0.18 | 9.8 | 4.3 | 3 |
| 3 | Allyl glycidyl ether | 0.48 | 9.7 | 4.3 | 3 |
| 4 | 1,2-Epoxy-7-octene | 0.86 | 4.9 | 6 | 3 |
| 5 | N-Vinylcaprolactam | 1.0 | 8.7 | 8.6 | 3 |
| 6 | Vinyltrimethoxysilane | 0.63 | 9.6 | 4.3 | 3 |
| 7 | Vinyltris(2-methoxyethoxy)-silane | 0.58 | 9.6 | 4.3 | 3 |
| 8 | Diethyl vinylphosphonate | 1.0 | 4.6 | 7.5 | 1.5 |
| 9 | Di-(2-chloroethyl) vinyl-phosphonate | 1.0 | 3.3 | 7.5 | 2 |

EXAMPLE 10

To a solution of 12.5 grams of polyphenylene ether in 125 ml. of toluene was added under nitrogen, with stirring, 7 ml. of glycidyl methacrylate and 0.48 gram of benzoyl peroxide. The mixture was heated under reflux for 3 hours and the epoxide-functionalized polyphenylene ether was isolated as in Examples 1-9.

EXAMPLE 11

A mixture of 970 grams of polyphenylene ether and 30 grams of mixed glycidyl ethyl maleate and glycidyl ethyl fumarate was extruded on a twin-screw extruder at 290° C. The resulting epoxy-functionalized polyphenylene ether was purified by reprecipitation from toluene with methanol, formation of the methylene chloride complex and thermal decomposition thereof as in Examples 1-7.

EXAMPLE 12

A mixture of 2.2 grams of polyphenylene ether, 0.5 ml. of glycidyl methacrylate and 0.1 gram of benzoyl peroxide was heated at 320°-330° C. under nitrogen for 5 minutes, with gentle stirring. Upon dissolution in toluene, reprecipitation with methanol, formation and thermal decomposition of the methylene chloride complex as previously described, there was obtained the desired epoxide-functionalized polyphenylene ether.

The functionalized polyphenylene ethers of this invention are useful in the preparation of compatibilized blends of polyphenylene ethers with such polymers as polyamides and linear polyesters. In particular, said functionalized polyphenylene ethers form copolymers with polyesters and polyamides, which may be used for compatibilization of such blends. Compositions comprising polyphenylene ether-polyester copolymers are disclosed and claimed in the aforementioned application Ser. No. 866,661, filed May 27, 1986. Another aspect of the invention is resinous compositions comprising at least one polyphenylene ether and at least one polyamide, about 10-90% and preferably about 10-50% by weight of said polyphenylene ether being a functionalized polyphenylene ether of this invention.

Polyamides suitable for use in said compositions may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH—group in the case of a lactam. As particular examples of amino-carboxylic acids and lactams there may be mentioned ε-aminocaproic acid, butyrolactam, pivalolactam, ε-caprolactam, capryllactam, enantholactam, undecanolactam, dodecanolactam and 3-and 4-aminobenzoic acids.

Diamines suitable for use in the preparation of the polyamides include the straight chain and branched chain alkyl, aryl and alkaryl diamines. Such diamines include, for example, those represented by the general formula $$H_2N(CH_2)_nNH_2$$

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula $$HOOC-Y-COOH$$

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include, for example, polyamide-6, 66, 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Among the linear polyesters which are useful in preparing copolymers with the functionalized polyphenylene ethers are the poly(alkylene dicarboxylates). They typically comprise at least 30 and most often at least 50 structural units, usually of the formula $$-O-R^4-O-\overset{O}{\underset{\|}{C}}-R^5-\overset{O}{\underset{\|}{C}}-. \qquad (VIII)$$

wherein $R^4$ aliphatic or alicyclic radical containing about 2-10 carbon atoms and $R^5$ is a divalent aliphatic, alicyclic or aromatic radical containing about 2-10 and usually about 6-10 carbon atoms.

Such polyesters are typically prepared by the known reaction of dihydroxy compounds with dicarboxylic acids or functional derivatives thereof such as anhydrides, acid chlorides or lower alkyl (especially methyl) esters, preferably the esters.

The $R^4$ radicals may be one or more aliphatic or alicyclic hydrocarbon radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol and 2-butene-1,4-diol. They may also be radicals containing substituents which do not substantially alter the reactivity of the dihydroxy compound (e.g., alkoxy, halo, nitrile) or hetero atoms (e.g., oxygen or sulfur). The $R^4$ radicals are usually saturated.

The $R^5$ radicals may be derived from such acids succinic, adipic, maleic, isophthalic and terephthalic acids or similar substituted and hetero atom-containing acids.

Most often, $R^4$ and $R^5$ are hydrocarbon radicals, typically containing about 2–10 carbon atoms. Preferably, $R^4$ is aliphatic and $R^5$ is aromatic. The polyester is most desirably a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526 |

The polyesters most often have number average molecular weights in the range of about 10,000–70,000, as determined by intrinsic viscosity (IV) at 30° C. in a mixture of 60% (by weight) phenol and 40% 1,1,2,2-tetrachloroethane.

It is also contemplated to employ elastomeric polyesters. Such polyesters are known in the art; they are exemplified by compositions in which a portion of the $R^4$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

To prepare the copolymer compositions, the functionalized polyphenylene ether and polyester or polyamide are heated together in solution or in the melt. The reaction temperature is typically within the range of about 100°–350° C., preferably about 150°–290° C. for polyesters. The proportions of functionalized polyphenylene ether and polyester or polyamide are not critical and may be adjusted over a wide range to yield copolymer compositions having the desired properties. The polyphenylene ether-polyamide compositions, however, generally contain about 5–75% by weight polyphenylene ether and about 25–95% polyamide.

In general, the copolymer compositions comprise only partially copolymer, with the balance being a polyphenylene ether-polyester or polyamide blend. The approximate proportion of copolymer in the composition may often be conveniently expressed as the percentage of copolymerized polyphenylene ether based on total polyester or polyamide. It may be determined by extracting unreacted polyphenylene ether with a suitable solvent, typically toluene or chloroform, and analyzing the insoluble residue (copolymer and residual polyester or polyamide) by proton nuclear magnetic resonance.

It is frequently preferred to maximize the proportion of carboxy end groups in the polyester. This may frequently be accomplished by preextruding the polyester, typically at a temperature in the range of about 250°–300° C. Under these conditions, there is apparently a loss by degradation and volatilization of hydroxy end group functionality, producing a polymer with a high proportion of carboxy end groups.

The preparation of polyphenylene ether-polyester copolymer compositions is illustrated by the following examples.

EXAMPLE 13

A solution of one gram each of the functionalized polyphenylene ether of Example 11 and a poly(butylene terephthalate) having a number average molecular weight of about 40,000 and a carboxy end group concentration of 24.7 microequivalents per gram in 25 ml. of 1,2,4-trichlorobenzene was heated under reflux for two days and cooled. Unreacted polyphenylene ether was removed as previously described, yielding the desired copolymer composition containing 40% copolymerized polyphenylene ether.

EXAMPLES 14–18

Various functionalized polyphenylene ethers were heated under reflux for 48 hours in a nitrogen atmosphere with an equal weight of the polyester of Example 13 in 1,2,4-trichlorobenzene solution. The products were isolated by precipitation into acetone and extraction with toluene as previously described. The results of analysis are given in Table II (PPE=polyphenylene ether).

TABLE II

| Example | Functionalized PPE of Example | % copolymerized PPE |
|---|---|---|
| 14 | 1 | 17 |
| 15 | 3 | 18 |
| 16 | 4 | 22 |
| 17 | 10 | 17 |
| 18 | 12 | 25 |

The above-described copolymer compositions, and polyphenylene ether-poly(alkylene dicarboxylate) and polyamide blends in which they are incorporated, have high impact strength, good solvent resistance and other advantageous properties. These properties make them useful for the preparation of molded and extruded articles.

The weight ratio of polyester or polyamide to total polyphenylene ether in the copolymer-containing blend is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 10–80% by weight of total resinous components.

The blends may also contain ingredients other than the copolymer, polyphenylene ether and polyester or polyamide. A particularly useful other ingredient in many instances is at least one elastomeric impact modifier which is compatible with the polyphenylene ether. It is generally present in the amount of about 5–25% by weight of resinous components.

Impact modifiers for polyphenylene ether-polyester or polyamide compositions are well known in the art. They are typically derived from one or more monomers selected from the group consisting of olefins, vinyl aromatic monomers, acrylic and alkylacrylic acids and their ester derivatives as well as conjugated dienes.

Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include poly(1-butene), poly(4-methyl-1-pentene), propylene-ethylene copolymers and the like. Additional olefin copolymers include copolymers of one or more $\alpha$-olefins with copolymerizable monomers including, for example, acrylic acids and alkylacrylic acids as well as the ester derivatives thereof including, for example, ethylene-acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include, for example, modified and unmodified polystyrenes, ABS type graft copolymers, AB and ABA type block and radial block copolymers and vinyl aromatic conjugated diene coreshell graft copolymers. Modified and unmodified polystyrenes include homopolystyrenes and rubber modified polystyrenes, such as butadiene rubber-modified polystyrene (otherwise referred to as high impact polystyrene or HIPS). Additional useful polystyrenes include copolymers of styrene and various monomers, including, for example, poly(styreneacrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers. The conjugated diene blocks may be selectively hydrogenated.

Suitable AB type block copolymers are disclosed in, for example, U.S. Pat. Nos. 3,078,254; 3,402,159; 3,297,793; 3,265,765 and 3,594,452 and UK Patent No. 1,264,741, all incorporated herein by reference. Exemplary of typical species of AB block copolymers there may be given:
polystyrene-polybutadiene (SBR)
polystyrene-polyisoprene and
poly(alpha-methylstyrene)-polybutadiene.
Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
polystyrene-polyisoprene-polystyrene (SIS),
poly($\alpha$-methylstyrene)-polybutadiene-poly($\alpha$-methylstyrene) and
poly($\alpha$-methylstyrene)-polyisoprene-poly($\alpha$-methylstyrene).
Particularly preferred triblock copolymers are available commercially as CARIFLEX ®, KRATON D ® and KRATON G ® from shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadieneacrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631. Especially for polyester blends, the core-shell elastomers containing, for example, a poly(alkyl acrylate) core attached to a polystyrene shell via an interpenetrating network are frequently useful; they are more fully disclosed in copending, commonly owned application Ser. No. 811,808, filed Dec. 20, 1985, now U.S. Pat. No. 4,681,915.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic etherester elastomers.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000-300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing blends include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The preparation of copolymer-containing blends is normally achieved under conditions adapted for the formation of an intimate resin blend. Such conditions often include extrusion, typically at temperatures in the range of about 100°-300° C. and otherwise under the conditions previously described. Extrusion may be conveniently effected in a screw-type or similar extruder which applies a substantial shearing force to the composition, thereby decreasing the particle size thereof. It is sometimes found that the impact strength of the composition is increased if it is extruded more than once, thereby insuring effective blending.

The preparation and properties of polyphenylene ether-polyester and polyamide blend compositions are illustrated by the following examples.

EXAMPLES 19-21

Mixtures of 49 parts of polyphenylene ether including a functionalized polyphenylene ether of this invention, 41 parts of a commercially available polyamide-66 and 10 parts of an impact modifier were tumble mixed in a jar mill and extruded at temperatures in the range of 185°-345° C. and 200 rpm., using a twin-screw extruder. The impact modifier was a commercially available styrene-butadiene-styrene triblock copolymer with a selectively hydrogenated butadiene midblock, in which the weight average molecular weights of the end blocks and midblock are 29,000 and 116,000, respectively.

The extrudates were quenched in water, pelletized and dried in a vacuum oven. They were then injection molded into notched Izod test specimens at 300° C. and 77.3 kg./sq. cm. The results are listed in Table III.

TABLE III

| | Functionalized PPE | | |
|---|---|---|---|
| Example | Identity | % by wt. of total PPE | Impact strength, joules/m. |
| 19 | Ex. 1* | 25 | 160 |
| 20 | Ex. 3 | 12.5 | 85 |
| 21 | Ex. 3 | 25 | 112 |

*Reprecipitated from toluene with methanol.

EXAMPLES 22-24

Blends of functionalized polyphenylene ether, polyester and the impact modifier of Examples 19-21 were prepared by extrusion under conventional conditions in a twin-screw extruder. The relevant proportions and parameters are given in Table IV. All ingredient percentages are by weight. Polyesters are identified as "PET" (polyethylene terephthalate) or "PBT" (polybutylene terephthalate) and by number average molecular weight.

TABLE IV

| | Example | | |
|---|---|---|---|
| | 22 | 23 | 24 |
| Polyphenylene ether, % | | | |
| Example 1 | 36 | — | — |
| Example 2 | — | 36 | 36 |
| Polyester, % | | | |
| PBT, 40,000 | 54 | 55 | — |
| PET, 45,000 | — | — | 55 |
| Impact modifier, % | 10 | 9 | 9 |
| Izod impact strength (notched), joules/m. | 134 | 219 | 64 |
| Tensile strength at yield, MPa. | 47.5 | 49.0 | 53.1 |
| Tensile strength at break, MPa. | 41.6 | 43.4 | 48.3 |
| Elongation at break, % | 70 | 38 | 75 |
| Tensile modulus, GPa. | — | — | 0.80 |
| Heat distortion temp., °C. | 167 | — | — |

What is claimed is:

1. A resinous composition comprising at least one polyphenylene ether, at least one polyamide and any reaction products thereof, at least a portion of said polyphenylene ether comprising a functionalized polyphenylene ether prepared by reacting a polyphenylene ether with at least one of glycidyl methacrylate, glycidyl acrylate, glycidyl ethyl maleate, glycidyl ethyl fumarate and allyl glycidyl ether.

2. A composition according to claim 1 wherein the polyamide is nylon-6 or nylon-66 and the polyphenylene ether comprises a plurality of structural units having the formula

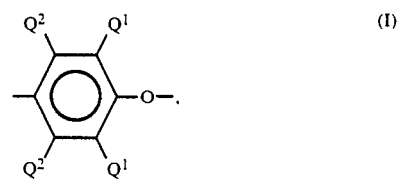

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A composition according to claim 2 wherein the polyphenylene ether is a poly(2,6-dimethyl-1,4-phenylene ether), and which also contains an impact modifier in the amount of about 4-25% by weight of resinous components.

4. A composition according to claim 3 wherein the impact modifying resin is a diblock copolymer of styrene and a conjugated diene or a triblock copolymer with styrene end blocks and a conjugated diene midblock and is present in an amount up to about 50 parts by weight per 100 parts of polyphenylene ether.

5. A composition according to claim 4 wherein the diene block has been selectively hydrogenated.

6. A composition according to claim 5 wherein the polyamide is nylon-66.

* * * * *

UNITED STATES PATENT AND TRADEMARK OFFICE
CERTIFICATE OF CORRECTION

PATENT NO. : 4,994,525
DATED : February 19, 1991
INVENTOR(S) : S. Bruce Brown

It is certified that error appears in the above-identified patent and that said Letters Patent is hereby corrected as shown below:

Column 2, line 19, before "or" the word "carbonoxy" should be deleted.

Column 3, lines 35, 49, 51 and 53, and column 4, lines 5 and 58, "$R^2$" should read --$R^6$--.

Column 4, lines 21-29, formula VI should read

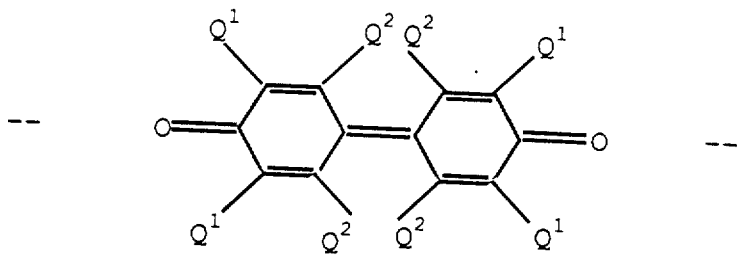

Column 9, line 7, --as-- should be inserted after "acids".

Column 12, line 9, "shell" should read --Shell--.

Signed and Sealed this

Fourth Day of August, 1992

*Attest:*

DOUGLAS B. COMER

*Attesting Officer*     *Acting Commissioner of Patents and Trademarks*